United States Patent
Jin et al.

(10) Patent No.: US 11,008,971 B1
(45) Date of Patent: May 18, 2021

(54) SAMPLING VIBRATION FREQUENCY RATE DOWNSIZING TYPE ENGINE COMBUSTION CONTROL METHOD AND ENGINE COMBUSTION CONTROL SYSTEM

(71) Applicants: HYUNDAI MOTOR COMPANY, Seoul (KR); KIA MOTORS CORPORATION, Seoul (KR)

(72) Inventors: Jae-Min Jin, Seoul (KR); In-Soo Jung, Goyang-si (KR); Seung-Hyun Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/816,701

(22) Filed: Mar. 12, 2020

(30) Foreign Application Priority Data

Nov. 7, 2019 (KR) .......................... 10-2019-0141455

(51) Int. Cl.
*F02D 41/40* (2006.01)
*F02D 41/28* (2006.01)
*F02D 41/14* (2006.01)
*G01M 15/12* (2006.01)

(52) U.S. Cl.
CPC ....... *F02D 41/401* (2013.01); *F02D 41/1498* (2013.01); *F02D 41/28* (2013.01); *F02D 41/403* (2013.01); *G01M 15/12* (2013.01); *F02D 2041/288* (2013.01); *F02D 2200/023* (2013.01); *F02D 2200/024* (2013.01); *F02D 2200/101* (2013.01)

(58) Field of Classification Search
CPC ......... F02D 2041/288; F02D 2200/025; F02D 2250/28; F02D 41/401; F02D 41/28; F02D 41/403; F02D 41/1498; F02D 2200/023; F02D 2200/101; F02D 2200/024; Y02T 10/40; G01M 15/12
See application file for complete search history.

(56) References Cited

U.S. PATENT DOCUMENTS

| | | | | |
|---|---|---|---|---|
| 8,997,723 | B2* | 4/2015 | Glugla | F02D 37/02 123/609 |
| 10,227,935 | B2* | 3/2019 | Ogata | F02D 13/0261 |
| 2004/0050363 | A1* | 3/2004 | Yamaoka | F02D 13/0265 123/435 |
| 2004/0194759 | A1* | 10/2004 | Yamaoka | F02D 41/006 123/435 |
| 2015/0354493 | A1* | 12/2015 | Jung | F02D 41/401 701/105 |

* cited by examiner

*Primary Examiner* — Sizo B Vilakazi
(74) *Attorney, Agent, or Firm* — Brinks Gilson & Lione

(57) ABSTRACT

An engine combustion control method may include: determining, by a controller, whether a fuel injection timing of an engine matches with an engine running condition of the engine; performing, by the controller, when the fuel injection timing matches with the engine running condition of the engine, a fuel injection variable establishment control (or a variable control of a fuel injection timing) that performs a Wavelet process on a frequency band selected by matching a vibration frequency of a vibration sensor signal to an engine frequency transformed under an engine running condition; and when the fuel injection timing matches with the engine running condition, updating a fuel injection parameter by correcting a target value of a combustion factor based on the fuel injection timing.

20 Claims, 7 Drawing Sheets

| ENGINE RPM (RPM) | frequency$_1$ = 02×ENGINE RPM+100[Hz] | frequency$_2$ |
|---|---|---|
| 1000 | 300 | 500 1250M OR LESS \|frequency$_2$-frequency$_1$\|=200Hz |
| 1250 | 350 | 500 |
| 1500 | 400 | 550 |
| 1750 | 450 | 600 |
| 2000 | 500 | 650 |
| 2250 | 550 | 700 |
| 2500 | 600 | 750 |

FOR EXAMPLE> 1650RPM CASE
frequency$_1$=0.2×1700+100=430Hz, frequency$_2$=540+150=580Hz

FIG. 4

SAMPLING VIBRATION FREQUENCY RATE DOWNSIZING TYPE ENGINE COMBUSTION CONTROL METHOD AND ENGINE COMBUSTION CONTROL SYSTEM

CROSS-REFERENCE TO RELATED APPLICATION

This application claims priority to and the benefit of Korean Patent Application No. 10-2019-0141455, filed on Nov. 7, 2019, the entire contents of which are incorporated herein by reference.

FIELD

The present disclosure relates to an engine combustion control.

BACKGROUND

The statements in this section merely provide background information related to the present disclosure and may not constitute prior art.

In general, an engine combustion control in a passenger vehicle is an important engine control technology to satisfy stable combustion and combustion noise control aspects in a combustion robustness control in disturbance conditions such as environment, a usage fuel difference, and engine aging, and high-compression rate engines such as a diesel engine and a passenger diesel engine.

As an example of the engine combustion control for this purpose, there is a method of performing an injection variable control (or a variable control of a fuel injection timing) by measuring a vibration value from a vibration sensor mounted to an engine block side, estimating, as combustion factors, a Location of Peak Pressure and an ignition start point by using Wavelet analysis (for example, Wavelet: an example of a signal processing technology that decomposes a signal into different frequency partial regions) for a signal in a frequency band determined by determining upper/lower limits of the frequency band having high combustion correlation from the measured vibration value, and applying a proportional/integral (PI) controller to the difference generated by comparing it with a target value set according to an engine running condition (or operating condition) based on the estimated combustion factor.

In particular, the engine combustion control applies a sampling vibration frequency rate to the measured vibration value of the vibration sensor according to the characteristics of using the vibration sensor, and increases the sampling vibration frequency rate up to 51.2 kHz, such that the result of estimating the combustion factor may be used in the generally operating region.

The contents described in Description of Related Art are to help the understanding of the background of the present disclosure, and may include what is not previously known to those skilled in the art to which the present disclosure pertains.

However, we have discovered that a 51.2 kHz region applied as a sampling vibration frequency rate in the engine combustion control allows an extracted combustion factor to be usable in a generally operating region while the calculation time desired for estimating a combustion factor is much taken due to the large measured data size having 51.2 kHz, thereby inevitably having the difficulty in practically applying to an engine system.

Furthermore, we have found that in order to estimate the combustion factor regardless of an engine running condition by using a vibration signal in the engine combustion control, a signal of a fixed frequency band should be used together with the signal measurement of a high sampling rate, thereby inevitably increasing the cost in the engine combustion control system configuration required together with a high-end central processing unit (CPU) due to the large calculation time load.

SUMMARY

The present disclosure provides an engine combustion control method and an engine combustion control system, which may lower the calculation time load desired for extracting the combustion factor under the condition of the sampling vibration frequency rate lower than the conventional one, thereby significantly reducing the system implementation cost, and in particular, move the combustion occurrence and the frequency band to a high frequency region according to an engine running condition to calculate a Location of Peak Pressure or a Location of Maximum Heat Release Ratio and a Start of Combustion from the injection timing, thereby enabling the downsizing of the sampling vibration frequency rate in which the combustion robustness control, which satisfies stable combustion and combustion noise control aspects even in the sampling vibration frequency rate that is 50% lower than the conventional one, is made.

In one form of the present disclosure, an engine combustion control method includes: determining, by a controller, whether a fuel injection timing of an engine matches with an engine running condition of the engine; performing, by the controller, when the fuel injection timing matches with the engine running condition of the engine, a variable control of a fuel injection timing that performs a Wavelet process on a frequency band selected by matching a vibration frequency of a vibration sensor signal to an engine frequency transformed under the engine running condition; and when the fuel injection timing matches with the engine running condition, updating, by the controller, a fuel injection parameter by correcting a target value of a combustion factor based on the fuel injection timing.

In one form, the engine running condition includes an engine RPM (revolutions per minute) and an engine load, the engine RPM is transformed into the engine frequency, the combustion factor includes at least one of a Location of Peak Pressure, a Location of Maximum Heat Release Ratio, or a Start of Combustion generated in the engine, and the fuel injection parameter is a main injection timing and a pilot injection timing of the engine.

In another form, the variable control of fuel injection timing is classified into a sampling frequency downsizing analysis control that calculates a Wavelet maximum value with the engine frequency, the vibration frequency, the frequency band, and the Wavelet process, and a combustion factor correction control that corrects a combustion factor target value for updating a fuel injection parameter by using the Wavelet maximum value.

In other form, the sampling frequency downsizing analysis control is performed by calculating a frequency$_1$ having a tendency of transforming an engine RPM into the engine frequency to increase in an engine RPM rising section, dividing the sampling frequency with a plurality of vibration signal scale factors of the frequency band selected by matching the frequency$_1$ to the frequency of the vibration sensor signal, generating a plurality of Wavelet transform values as a result of the Wavelet process for each of the plurality of vibration signal scale factors, and calculating the Wavelet maximum value by summing the plurality of Wavelet transform values into one.

In still other form, calculating the frequency$_1$ includes: applying a frequency transform factor and a frequency correction value to the engine RPM, and making a pair with a frequency$_2$ having a tendency of increasing in the engine RPM rising section. The Wavelet transform value is calculated by applying a Mother wavelet function of Meyer. The Wavelet maximum value is calculated by performing a smoothing processing by applying a Coefficient to a cubic spline as 0.7. The Wavelet maximum value is applied to calculate, as combustion factors, the Location of Peak Pressure, the Location of Maximum Heat Release Ratio, and the Start of Combustion.

In one aspect of the present disclosure, the combustion factor correction control includes: performing an injection timing target value correction control that applies a combustion factor target value correction calculated based on target combustion factor correction values of a Location of Peak Pressure or a Location of Maximum Heat Release Ratio included in the combustion factor; and performing a Start of Combustion target value correction control that applies the combustion factor target value correction calculated based on a target Start of Combustion correction value of the Start of Combustion included in the combustion factor.

In another form, the injection timing target value correction control is performed by calculating a correction Location of Peak Pressure calculation value by reading the Location of Peak Pressure offset of the Location of Peak Pressure or a correction Location of Maximum Heat Release Ratio calculation value by reading the Location of Maximum Heat Release Ratio offset of the Location of Maximum Heat Release Ratio, and calculating a target Location of Peak Pressure correction value by reading a Location of Peak Pressure target value of the Location of Peak Pressure or a target Location of Maximum Heat Release Ratio correction value by reading a Location of Maximum Heat Release Ratio target value of the Location of Maximum Heat Release Ratio.

In one form, the correction Location of Peak Pressure calculation value is calculated by summing the Wavelet maximum value and the Location of Peak Pressure offset and the correction Location of Maximum Heat Release Ratio calculation value is calculated by summing the Wavelet maximum value and the Location of Maximum Heat Release Ratio offset.

In another form, the target Location of Peak Pressure correction value is calculated based on a difference between the Location of Peak Pressure target value and the correction Location of Peak Pressure calculation value, and the target Location of Maximum Heat Release Ratio correction value is calculated by the difference between the Location of Maximum Heat Release Ratio target value and the correction Location of Maximum Heat Release Ratio calculation value.

In other form, the Start of Combustion target value correction control is performed by calculating a correction Start of Combustion calculation value by reading a Start of Combustion (SoC) offset of the Start of Combustion, and calculating a target Start of Combustion correction value by reading a Start of Combustion target value of the Start of Combustion.

In one form, the correction Start of Combustion calculation value is calculated by summing the Wavelet maximum value and the Start of Combustion (SoC) offset. The target Start of Combustion (SoC) correction value is calculated based on the difference between the Start of Combustion (SoC) target value and the correction Start of Combustion (SoC) calculation value.

In another form, the updated value of the fuel injection parameter is output from the controller to the PI controller, and the PI controller performs the adjustment of the fuel injection timing with a main injection timing and a pilot injection timing of the engine by using a P control value and an I control value.

In another form of the present disclosure, an engine combustion control system includes: a controller configured to: perform a Wavelet process on a frequency band corresponding to as an engine vibration frequency matched to an engine frequency obtained by transforming an engine RPM at which an engine running condition of the engine is matched with a fuel injection timing of the engine, and update a fuel injection parameter by correcting target values of a Location of Peak Pressure, a Location of Maximum Heat Release Ratio, and a Start of Combustion, which are combustion factors, with a Wavelet maximum value calculated through the Wavelet process; and a vibration sensor mounted to a block of the engine to detect the engine vibration frequency.

In one form, the controller outputs the updated value of the fuel injection parameter to a PI controller, and the PI controller controls a main injection timing and a pilot injection timing of an engine combustion by using a Proportional (P) control value and an Integral (I) control value.

The engine combustion control applied to the engine combustion control system according to the present disclosure implements the following operations and effects.

Firstly, it is possible to perform the engine combustion control with the combustion factor estimation logic using the accelerometer under the sampling vibration frequency rate downsizing condition, thereby significantly lowering the calculation time load and the system implementation cost with the sampling vibration frequency rate that is 50% lower than the conventional one.

Secondly, it is possible to maintain the high combustion robustness effect under the acceleration running condition of the vehicle with the combustion factor estimation using the vibration signal-based measured value having the estimation effect that is superior to the combustion pressure-based measured value.

Thirdly, it is possible to realize the low central processing unit (CPU) load and low cost system, thereby performing the combustion control in the actual vehicle based on the vibration signal having excellent combustion factor estimation compared to one based on the combustion pressure.

Fourthly, it is possible to enable the downsizing adjustment that actually lowers the sampling vibration frequency rate from 51.2 kHz to 21.6 kHz level, thereby implementing estimation performance exceeding about 88% compared to the conventional technology under the 1250 RPM condition when setting the 1250 to 2500 RPM condition to the general operating region.

Fifthly, it may be greatly advantageous for the commercialization of the combustion control logic with the processing amount smaller than the conventional one even while being one based on the vibration signal having the effect that is superior to one based on the combustion pressure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is an example of the frequency transform of an engine RPM in which the frequency matching of a vibration sensor signal is applied as the engine running condition in one form of the present disclosure;

Figure 1:
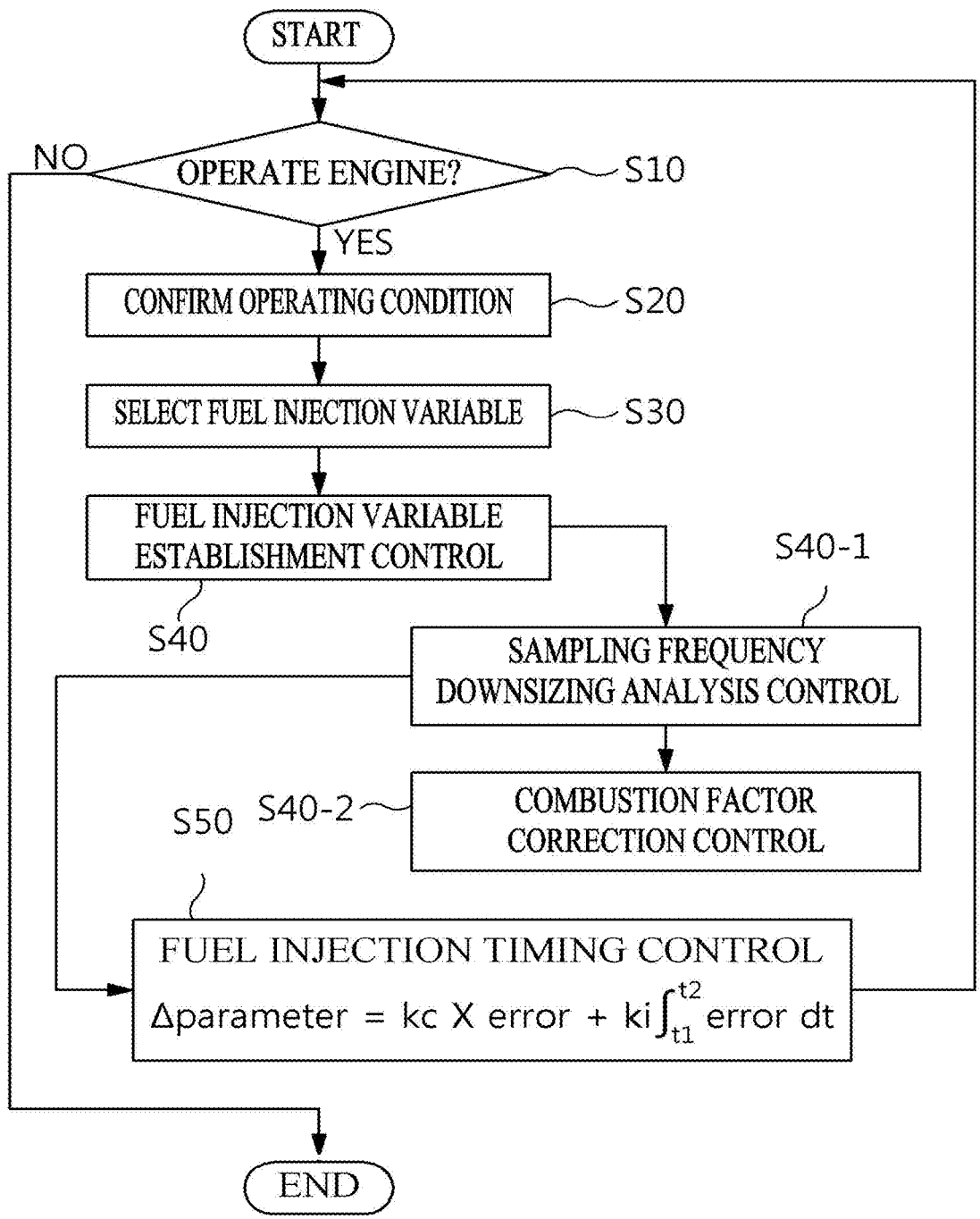
FIG. 1 is a flowchart of a sampling vibration frequency rate downsizing type engine combustion control method according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings, and since the exemplary form, as an example, may be implemented by those skilled in the art to which the present disclosure pertains in various different forms, it is not limited to the forms described herein.

Referring to FIG. 1, an engine combustion control method selects a fuel injection variable (S30) when confirming an engine running condition (S20) according to operating an engine (S10) and then performs a fuel injection variable establishment control (or a variable control of a fuel injection timing) (S40), and then switches it to a fuel injection timing control (S50) to control the fuel injection of a fuel injector of an engine.

Therefore, the engine combustion control method may extract the frequency region of a vibration signal directly associated with the combustion according to the engine running condition, thereby implementing estimation performance exceeding 88% without an error under the 1250 to 2500 RPM condition that is the general operating region, and also shortening the time desired for estimating the combustion factor compared to the conventional 51.2 kHz sampling rate at the sampling rate lowered to a 21.6 kHz level.

As a result, the engine combustion control method is characterized by the sampling vibration frequency rate downsizing type engine combustion control method, and this characteristic proves that by maintaining estimation performance even under the acceleration running condition of the vehicle, the combustion factor estimation method may perform the combustion control in the same manner as using the combustion pressure-based measured value even while using the vibration signal.

Figure 2:
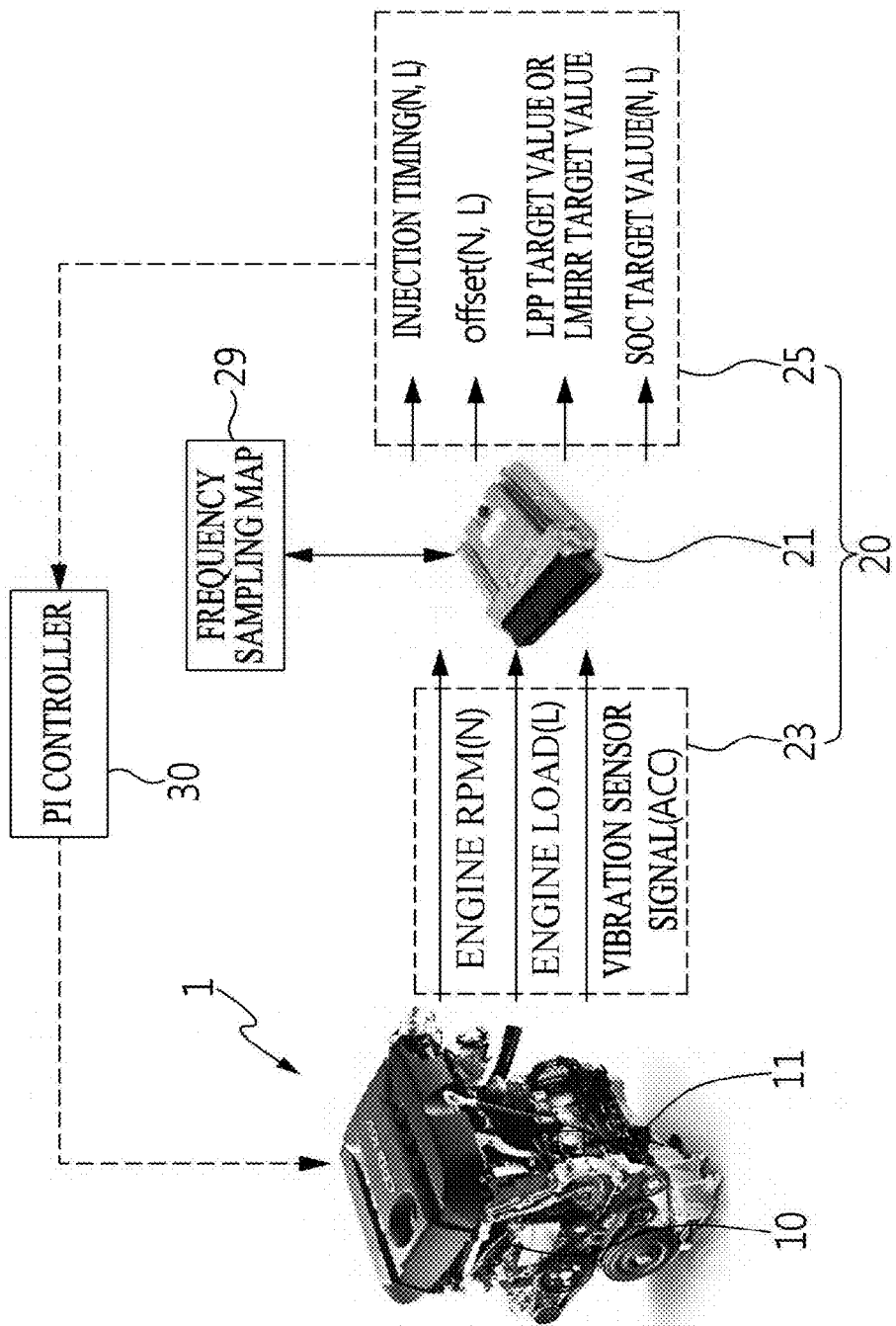
FIG. 2 is an example of an engine combustion control system implementing the sampling vibration frequency rate downsizing type engine combustion control method according to one form of the present disclosure.

Referring to FIG. 2, an engine combustion control system 1 includes an engine 10, a vibration sensor 11, a control unit (or a signal processing controller or processor) 20, and a PI controller 30. As used here, 'a controller' or 'a control unit' for the engine may be embodied in a hardware manner (e.g., a processor), a software manner, or combination of the hardware and the software manner (i.e., a series of commands), which process at least one function or operation. Also, the terms, such as 'unit' or 'module', etc., should be understood as a unit that processes at least one function or operation and that may be embodied in a hardware manner (e.g., a processor), a software manner, or a combination of the hardware manner and the software manner.

For example, the engine 10 may be a diesel engine or a Gasoline Direct Injection (GDI) engine. The vibration sensor 11 is installed in a block of the engine 10 to detect a vibration signal according to the combustion to deliver it to the signal processing controller 20.

For example, the control unit 20 calculates a fuel injection variable value from the signal of the vibration sensor 11 (that is, the vibration sensor signal) by the frequency sampling rate analysis while determining the engine running condition of the engine 10 with the engine RPM (revolutions per minute) and the engine load obtained by a sensor or logic, and outputs it as a Proportional Integral (PI) control value to provide it to the PI controller 30. To this end, the signal processing controller 20 includes a data processing module 21 having a central processing unit and a memory, a data input block 23, a data output block 25, and a frequency sampling map 29.

For example, the PI controller 30 outputs a P signal or an I signal to control a fuel injection timing (that is, a fuel injector operation) of the engine 10.

Hereinafter, the sampling vibration frequency rate downsizing type engine combustion control method in FIG. 1 will be described in detail with reference to FIGS. 2 to 7. In this case, the control subject is the signal processing controller 20, and the control object is the engine 10 including an ignition plug.

Referring to FIG. 1, when confirming that the operating of the engine (S10) is a key on (IG ON), the signal processing controller 20 determines the engine running condition by using the engine RPM and the engine load in order to confirm the engine running condition (S20), then confirms it with whether the fuel injection timing matches, and extracts the frequency region of the vibration signal directly associated with the combustion from the engine vibration measurement signal of the vibration sensor according to the engine running condition for the selecting of the fuel injection variable (S30).

Subsequently, the signal processing controller 20 performs the fuel injection variable establishment control (or a fuel injection variable control) (S40) by sequentially performing a sampling frequency downsizing analysis control (S40-1) followed by a combustion factor correction control (S40-2), and performs the fuel injection timing control (S50). Hereinafter, the fuel injection variable establishment control means the variable control of the fuel injection timing.

Referring to FIG. 2, the signal processing controller 20 calculates a change in the fuel injection variable by confirming the engine running condition in the data processing module 21 and then outputs an engine running condition combustion signal.

To this end, the data processing module 21 calculates the change in the fuel injection variable according to the confirming of the engine running condition and then outputs the engine running condition combustion signal. In this case, the confirming of the engine running condition uses the engine RPM and the engine load, and the calculating of the change in the fuel injection variable selects and moves a window (for example, applying the frequency sampling rate of a 21.6 kHz level) in the frequency band having high correlation with the combustion signal according to the engine running condition during the signal processing of a vibration sensor signal (Acc), integrates a Wavelet value for each frequency band to calculate a Location of Peak Pressure (LPP) or a Location of Maximum Heat Release Ratio (LMHRR), and then calculates a Start of Combustion (SoC) from the calculated Location of Peak Pressure (or Location of Maximum Heat Release Ratio) and the injection timing. The engine running condition combustion signal is classified into an injection timing, an offset, an LPP target value (or an LMHRR target value), and a SoC target value.

The data input block 23 provides, as input data, the engine RPM, the engine load, and the vibration sensor signal to the data processing module 21. Further, the data output block 25 outputs the injection timing, the offset, the LPP target value (or the LMHRR target value), and the SoC target value of the data processing module 21 to the PI controller 30.

In particular, the frequency sampling map 29 matches the LPP target value, the LMHRR target value, and the SoC target value with the LPP calculation value, the LMHRR calculation value, and the SoC calculation value, respectively, to correct the existing values to new values.

The PI controller 30 outputs a P signal or an I signal as the injection timing, the offset, the LPP target value (or the LMHRR target value), and the SoC target value of the data output block 25 to control the combustion timing (that is, the ignition plug operation) of the engine 10.

Meanwhile, FIGS. 3 to 6 illustrate specific procedures of the fuel injection variable establishment control (S40).

Figure 3:
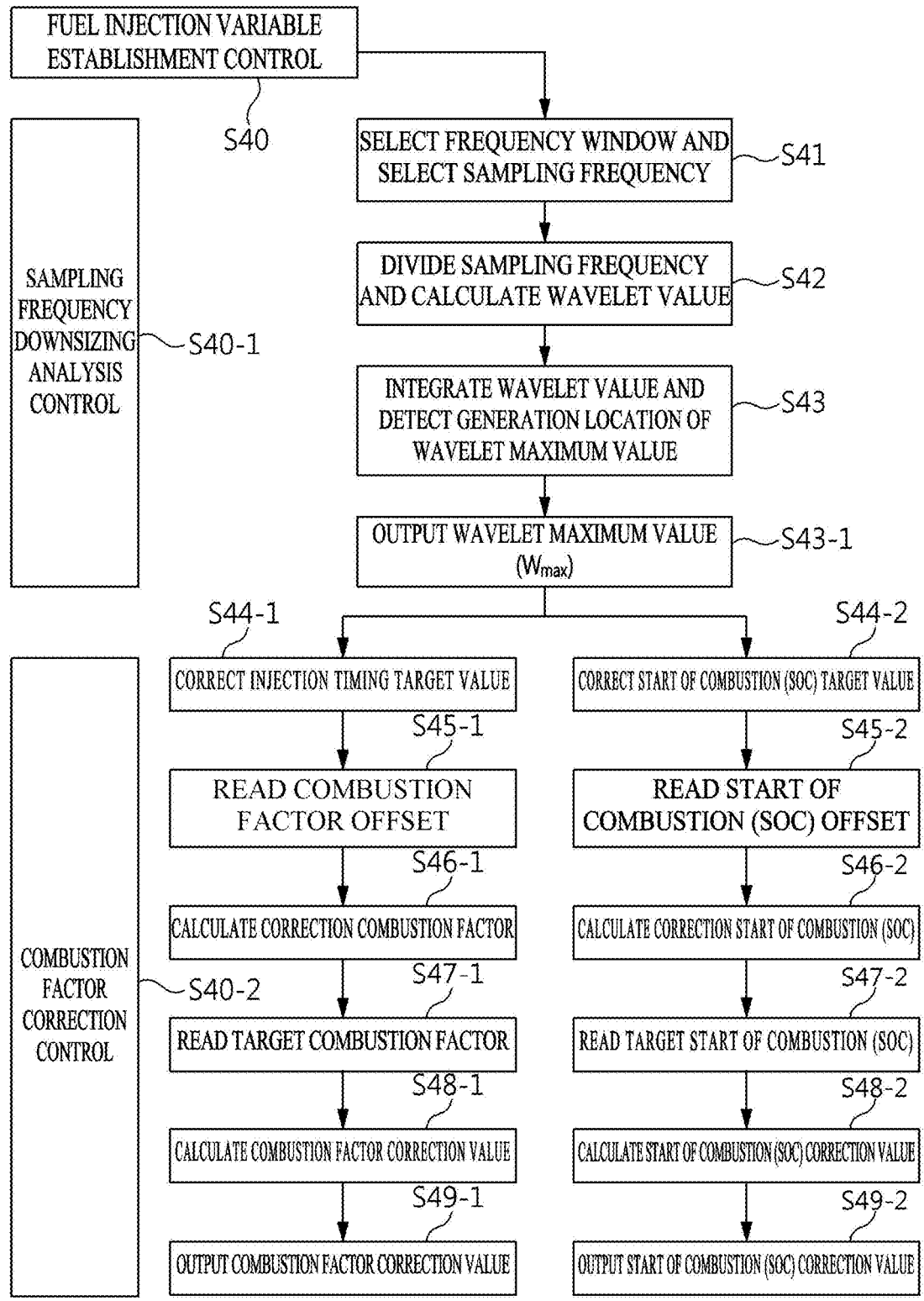
FIG. 3 is a flowchart of a fuel injection variable establishment control that enables the downsizing of the sampling vibration frequency rate in the engine combustion control method according to one form of the present disclosure.

Referring to FIG. 3, the signal processing controller 20 classifies the fuel injection variable establishment control (S40) into the sampling frequency downsizing analysis control (S40-1) and the combustion factor correction control (S40-2).

In particular, the fuel injection variable establishment control (S40) performs a Wavelet analysis processing for the vibration signal of the engine block, estimates the combustion factors (LPP, LMHRR, SoC) based on the fuel injection timing, optimizes the amount of data by selecting, as the frequency band region, a frequency$_1$ given as a function of the engine RPM and a frequency$_2$ increasing by 150 Hz based on the above for the Wavelet analysis processing of the vibration occurring in the block, obtains a Wavelet value by the six equal division to use the difference relative to a target combustion factor based on the estimated combustion factor, and controls fuel injection parameters (that is, a main injection timing, a pilot injection timing of the fuel injector) with the PL of the PI controller to control the combustion constantly.

Specifically, the sampling frequency downsizing analysis control (S40-1) is performed by matching the engine running condition (S41), applying the vibration sensor signal (S42), analyzing the Wavelet (operation S43), and outputting the Wavelet (S43-1). Therefore, the sampling frequency downsizing analysis control (S40-1) may use the vibration signal selected by selecting and moving to the frequency band having the high correlation with the combustion signal according to the engine running condition during the signal processing of the vibration sensor signal (Acc), thereby calculating the Location of Peak Pressure or the Location of Maximum Heat Release Ratio from the integrated result, and calculating the Start of Combustion from the calculated Location of Peak Pressure (or Location of Maximum Heat Release Ratio) and the injection timing.

For example, the matching of the engine running condition (S41) transforms the engine RPM applied as the engine running condition of the engine RPM and the engine load into a frequency, and sets the matching region of the frequency window and the sampling frequency of the vibration sensor signal in order to control parameters (that is, the main injection timing and the pilot injection timing of the fuel injector) applied to the fuel injection variable therefrom.

Referring to FIG. 4, it is illustrated that the engine RPM applied as the engine running condition may be transformed into the engine frequencies of the frequency$_1$ and the frequency$_2$ to match it with the vibration frequency of the vibration sensor signal.

In particular, since the frequency$_1$ and the frequency$_2$ tend to become larger as they rise in the rising section of the engine RPM, there has the tendency that a value of the |frequency$_2$−frequency$_1$| should be large in the low engine RPM section. Therefore, a frequency transform formula of the engine RPM is applied to the frequency$_1$ and the frequency$_2$.

Frequency transform formula of the engine RPM:

$$\text{frequency}_1 = A * \text{engine RPM} + K1;$$

$$\text{frequency}_2 = \text{frequency}_1 + K2; \text{ and}$$

$$|\text{frequency}_2 - \text{frequency}_1| = K2,$$

Where "A" applies 0.2 as a dimensionless frequency transform factor, K1 applies 100 Hz as a frequency correction value, and K2 applies 150 Hz as a frequency correction value. "*" refers to a multiplication symbol.

As illustrated, if the engine RPM is 1650 RPM, it is calculated that the frequency$_1$=0.2*1700+100 Hz=430 Hz, and the frequency$_2$=430+150=580 Hz. Therefore, it is determined as |frequency$_2$−frequency$_1$|=150 Hz, and the frequency$_1$ may be matched with the frequency of the vibration sensor signal by being set to 450 Hz based on 1750 RPM to generate a difference of 50 Hz per 250 RPM. However, the region of 1250 RPM or less may be set to |frequency$_2$−frequency$_1$|=200 Hz. However, the frequency$_1$ may be set to 450 Hz based on 1750 RPM to generate a difference of 30 Hz per 250 RPM, which is set to improve the continuity (that is, smoothing) of the Wavelet Transform.

As a result, in the matching the engine running condition S41), the frequency window and the sampling frequency of the vibration sensor signal (Acc) may have the matching region with the engine RPM applied as the engine running condition set from the frequency$_1$ relative to the engine RPM. Therefore, the sampling rate of the frequency of the vibration sensor signal (Acc) may be lowered by about 50% to a 21.6 kHz level compared to the existing 51.2 kHz sampling rate, thereby significantly shortening the time desired for estimating the combustion factor compared to the conventional one by the sampling frequency downsizing analysis control.

For example, the applying the vibration sensor signal (S42) sets the matching region of the frequency window and the sampling frequency of the vibration sensor signal by determining the frequency$_1$ obtained under the engine running condition to which the engine RPM has been applied, and performs the sampling frequency division and the calculation of the Wavelet value with respect to the frequency band of the vibration sensor signal matched with the frequency$_1$.

Figure 5:
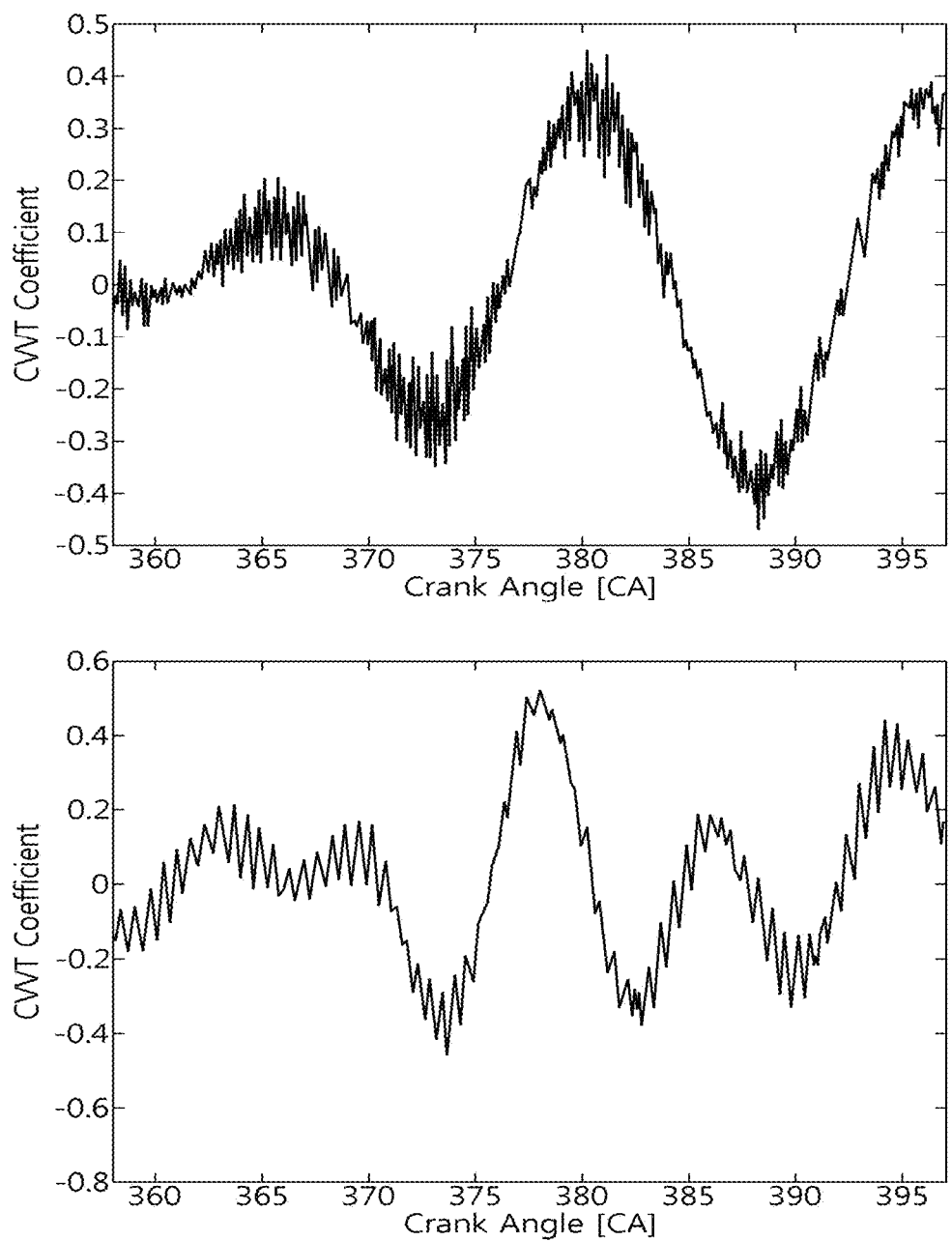
FIG. 5 are diagrams illustrating that a frequency of the vibration sensor signal of an engine measured by the vibration sensor exemplifies a vibration signal scale factor of a CVVT coefficient-crank angle plot in one form of the present disclosure.

Referring to FIG. 5, it illustrates an example in which the frequency of the vibration sensor signal (Acc) is represented as a Vibration Signal Scale Factor of a Continuously Variable Valve Timing Coefficient (CVVT Coefficient)—a crank angle plot. The vibration signal scale factor represented at the left side of FIG. 5 exemplifies about 600 Hz, and the vibration signal scale factor represented at the right side of FIG. 5 exemplifies about 900 Hz. Therefore, the vibration signal scale factor is used to generate a plurality of peak generation points, and to confirm the vibration value at which the sum of the vibration Wavelet values increases after the combustion has occurred from the first and second peak generation points among the plurality of peak generation points.

For example, the analyzing the Wavelet (S43) integrates each Wavelet value of six vibration signal scale factors in the frequency band determined by applying the frequency transform formula of the engine RPM and then detects the generation location of a Wavelet maximum value ($W_{max}$) (for example, the first and second peak generation points) from the integrated value. The outputting the Wavelet (S43-1) outputs the Wavelet maximum value ($W_{max}$) to provide it to the combustion factor correction control (S40-2).

Figure 6:
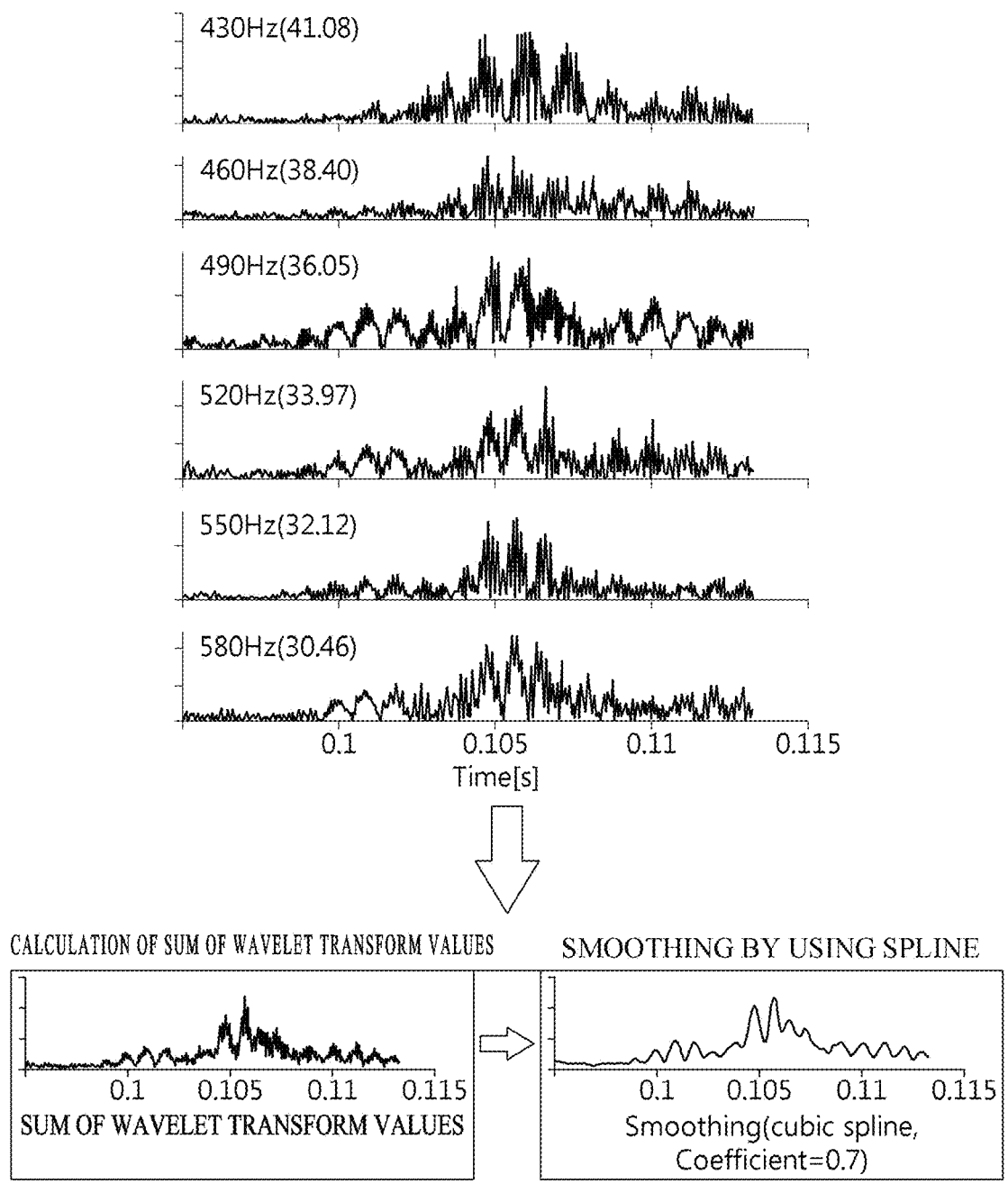
FIG. 6 is a diagram illustrating a Wavelet analysis state for a vibration frequency of a sampling frequency downsizing analysis control according to one form of the present disclosure.

Referring to FIG. 6, it illustrates that the six vibration signal scale factors classifies the engine RPM of 1650 RPM into six equal parts of 430 Hz, 460 Hz, 490 Hz, 520 Hz, 550 Hz, and 580 Hz so that the frequency$_1$ has a difference of 30 Hz to be classified into a 430 Hz scale factor, a 460 Hz scale factor, a 490 Hz scale factor, a 520 Hz scale factor, a 550 Hz scale factor, and a 580 Hz scale factor.

For example, the upper figure in FIG. 6 is a state of a Wavelet transform (or a Wavelet transform following an FFT) of six vibration signal scale factors. In this case, the Wavelet transform is performed by a Mother Wavelet function of Meyer.

On the other hand, the lower left figure in FIG. 6 is a state that represents the first and second peak generation points among the plurality of peak generation points more clearly by summing and transforming all of a Wavelet transform value of the 430 Hz scale factor, a Wavelet transform value of the 460 Hz scale factor, a Wavelet transform value of the 490 Hz scale factor, a Wavelet transform value of the 520 Hz scale factor, a Wavelet transform value of the 550 Hz scale factor, and a Wavelet transform value of the 580 Hz scale factor into one Wavelet maximum value ($W_{max}$). Further, the lower right figure in FIG. 6 is a state where the first and second peak generation points become clearer by smoothing the Wavelet maximum value ($W_{max}$). In this case, the smoothing is performed by applying a Coefficient as 0.7 while using a cubic spline, which is an algorithm for smoothly connecting given points.

Therefore, the outputting the Wavelet (S43-1) outputs the Wavelet maximum value ($W_{max}$) obtained from six vibration signal scale factors. In this case, the Wavelet maximum value ($W_{max}$) is used to calculate the Location of Peak Pressure (LPP), the Location of Maximum Heat Release Ratio (LMHRR), and the Start of Combustion (SoC), which are the combustion factors, and the calculation process applies the same manner as the conventional one in which the first and second peak generation points are obtained by matching by the mapping with construction data (or table) of the frequency sampling map 29.

Referring back to FIG. 3, specifically, the combustion factor correction control (S40-2) is classified into an injection timing target value correction control (S44-1) and a Start of Combustion target value correction control (S44-2). Therefore, each of the Location of Peak Pressure (LPP), the Location of Maximum Heat Release Ratio (LMHRR), and the Start of Combustion is corrected, such that the fuel injection timing is newly updated in the frequency sampling map 29.

Specifically, the injection timing target value correction control (S44-1) is performed by applying a combustion factor offset (S45-1), calculating a correction combustion factor (S46-1), applying a target combustion factor (S47-1), calculating a combustion factor correction value (S48-1), and outputting a combustion factor correction value (S49-1).

For example, the applying the combustion factor offset (S45-1) is performed by reading an $LPP_{offset}$ value, which is an offset of the Location of Peak Pressure (LPP), or an $LMHRR_{offset}$ value, which is an offset of the Location of Maximum Heat Release Ratio (LMHRR) from the frequency sampling map 29 by the signal processing controller 20. The calculating the correction combustion factor (S46-1) is performed by applying the Wavelet maximum value ($W_{max}$) and the combustion factor offsets ($LPP_{offset}$, $LMHRR_{offset}$) to the following correction combustion factor calculation formula.

Correction combustion factor calculation formula:

$$LPP_{Estimated} = W_{max} + LPP_{offset}; \text{ and}$$

$$LMHRR_{Estimated} = W_{max} + LMHRR_{offset}$$

As a result, the correction combustion factor calculation values ($LPP_{Estimated}$, $LMHRR_{Estimated}$) are calculated by summing the Wavelet maximum value ($W_{max}$) and the combustion factor offsets ($LPP_{offset}$, $LMHRR_{offset}$).

For example, the applying the target combustion factor (S47-1) may be performed by reading an $LPP_{Target}$ value, which is a target value of the Location of Peak Pressure (LPP), or an $LMHRR_{Target}$ value, which is a target value of the Location of Maximum Heat Release Ratio (LMHRR) from the frequency sampling map 29 by the signal processing controller 20. The calculating the combustion factor correction value (S48-1) is performed by applying the correction combustion factor calculation values ($LPP_{Estimated}$ and $LMHRR_{Estimated}$) and the combustion factor target values ($LPP_{Target}$ and $LMHRR_{Target}$) to the following correction target combustion factor calculation formula.

Correction target combustion factor calculation formula:

$$LPP_{Error} = LPP_{Target} - LPP_{Estimated}; \text{ and}$$

$$LMHRR_{Error} = LMHRR_{Target} - LMHRR_{Estimated}.$$

As a result, the target combustion factor correction values ($LPP_{Error}$, $LMHRR_{Error}$) are calculated by subtracting the correction combustion factor calculation values ($LPP_{Estimated}$, $LMHRR_{Estimated}$) from the combustion factor target values ($LPP_{Target}$, $LMHRR_{Target}$).

For example, the outputting the combustion factor correction value (S49-1) is performed by transmitting the combustion factor correction values ($LPP_{Error}$, $LMHRR_{Error}$) from the data processing module 21 to the data output block 25 by the signal processing controller 20, and the data output block 25 outputs it to the PI controller 30.

Specifically, the Start of Combustion target value correction control (S44-2) is performed by applying the Start of Combustion offset (S45-2), calculating the correction Start of Combustion (S46-2), applying the target Start of Combustion (S47-2), calculating the Start of Combustion correction value (S48-2), and outputting the Start of Combustion correction value (S49-2).

For example, the applying the Start of Combustion offset (S45-2) is performed by reading the SoC offset value that is the offset of the Start of Combustion in the frequency sampling map 29 by the signal processing controller 20. The calculating of the correction Start of Combustion (S46-2) is performed by applying the Wavelet maximum value ($W_{max}$) and the SoC offset to the following correction Start of Combustion calculation formula.

Correction Start of Combustion calculation formula:

$$SoC_{Estimated} = W_{max} + SoC_{offset}$$

As a result, the correction Start of Combustion calculation value ($SoC_{Estimated}$) is calculated by summing the Wavelet maximum value ($W_{max}$) and the SoC offset.

For example, the applying the target Start of Combustion (S47-2) is performed by reading the $SoC_{Target}$ value that is the target value of the target Start of Combustion in the frequency sampling map 29 by the signal processing controller 20. The calculating the Start of Combustion correction value (S48-2) is performed by applying the correction Start of Combustion calculation value ($SoC_{Estimated}$) and the Start of Combustion target value ($SoC_{Target}$) to the following correction target Start of Combustion calculation formula.

Correction target Start of Combustion calculation formula:

$$SoC_{Error} = SoC_{Target} - SoC_{Estimated}$$

As a result, the target Start of Combustion correction value ($SoC_{Error}$) is calculated by subtracting the correction Start of Combustion calculation value ($SoC_{Estimated}$) from the Start of Combustion target value ($SoC_{Target}$).

For example, the outputting of the Start of Combustion correction value (S49-2) is performed by transmitting the target Start of Combustion correction value ($SoC_{Error}$) from the data processing module 21 to the data output block 25 by the signal processing controller 20, and the data output block 25 outputs it to the PI controller 30.

Referring back to FIG. 1, the signal processing controller 20 performs the fuel injection timing control (S50), and feeds back to the operating of the engine (operation S10) after the fuel injection. In this case, the fuel injection timing control (S50) applies the same fuel injection timing control formula as the existing fuel injection control, and therefore, constantly controls the combustion by the adjustment of the fuel injection timing that uses the main injection timing and the pilot injection timing of the fuel injector of the engine 10 according to the engine running condition as the fuel injection parameters.

Fuel injection timing control formula:

$$\Delta parameter = k_c \times error + k_i \int_{t_1}^{t_2} error \, dt$$

where, $\Delta parameter$ refers to a change value of the fuel injection variable, $K_c$ refers to a fuel injection change correction coefficient that is proportional to the difference between the current target value and the current value in order to correct the fuel injection change and is applied as a coefficient for compensating for the error of the current state, $K_i$ refers to an index that corrects the difference between the target value and the estimated value based on the integrated value at $t_i$ time point from $t_1$ to $t_2$ time point and is applied as a coefficient for adjusting the error occurring in a period of a constant time $(t_2-t_1)$, $t_1$, $t_2$ refers to integral times, and error is the difference between the target value and the estimated value.

Figure 7:
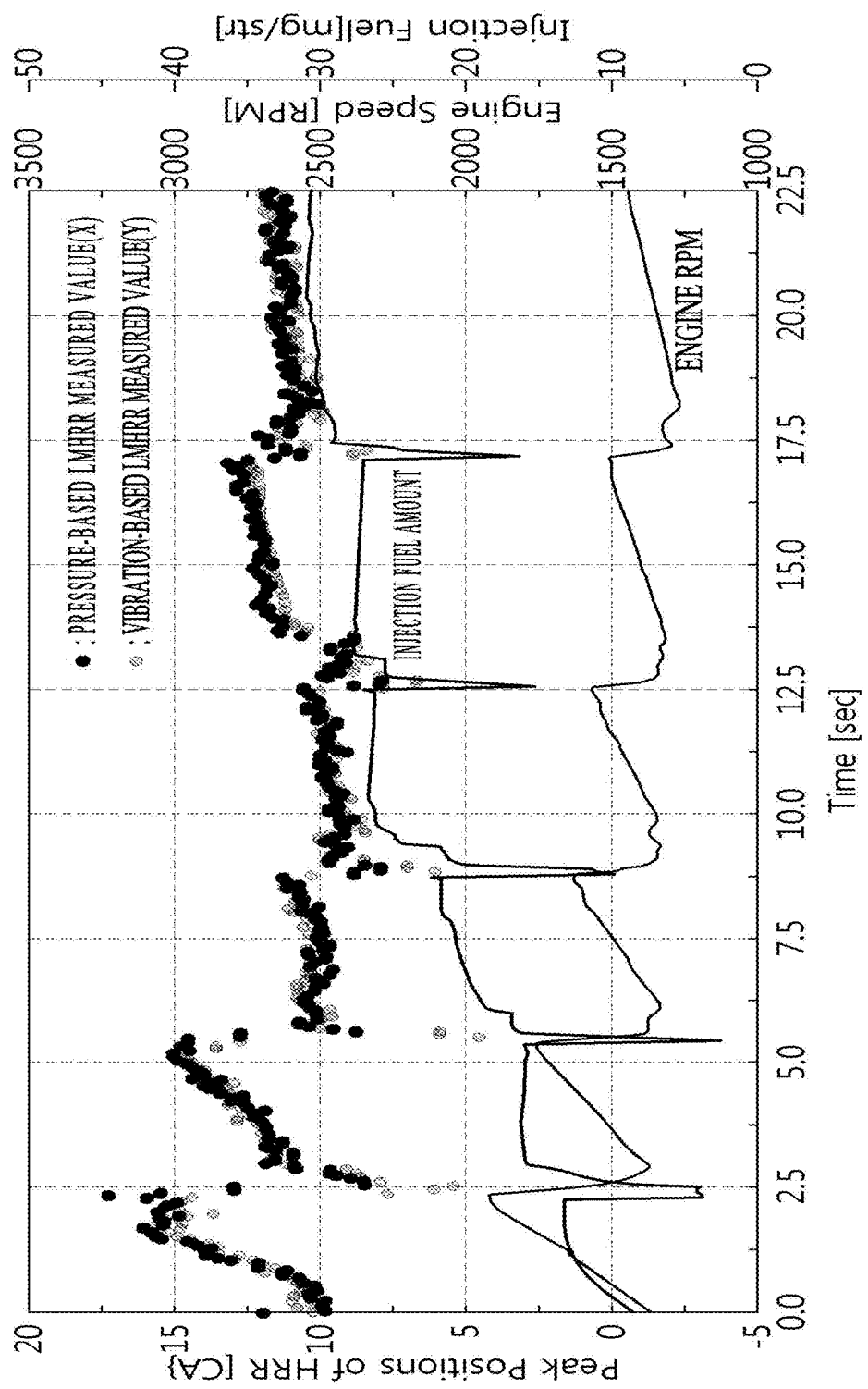
FIG. 7 is an effect plot of the engine combustion control applying the downsizing of the sampling vibration frequency rate according to one form of the present disclosure.

Meanwhile, FIG. 7 is an example of a Heat Release Rate (HRR)-time plot for the sampling vibration frequency rate downsizing type engine combustion control effect.

As illustrated, it is proved that the HRR-time plot illustrating the result performed under the acceleration running condition of the vehicle indicates that the combustion factor estimation is well estimated by using the vibration signal of the vibration sensor 11 compared to the value measured based on the combustion pressure, such that the sampling vibration frequency rate downsizing type engine combustion control may be applied to the combustion control in the actual vehicle based on the vibration signal.

As described above, the sampling vibration frequency rate downsizing type engine combustion control method applied to the engine combustion control system 1 according to the present form performs the Wavelet processing by selecting the frequency band as the engine vibration frequency according to the engine frequency having transformed the engine RPM confirmed by the signal processing controller 20 under the engine running condition matched with the fuel injection timing, and corrects the target values of the Location of Peak Pressure, the Location of Maximum Heat Release Ratio, and the Start of Combustion, which are the combustion factors, with the Wavelet maximum value ($W_{max}$) calculated by the Wavelet processing to update the main injection timing and the pilot injection timing, which are the fuel injection parameters, thereby implementing the estimation performance exceeding 88% without an error under the 1250 to 2500 RPM condition that is the general operating region, and shortening the time desired for estimating the combustion factor at the sampling rate lowered to a 21.6 kHz level compared to the existing 51.2 kHz sampling rate.

What is claimed is:

1. An engine combustion control method, comprising:
   determining, by a controller, whether a fuel injection timing of an engine matches with an engine running condition of the engine;
   performing, by the controller, when the fuel injection timing matches with the engine running condition, a variable control of a fuel injection timing that performs a Wavelet process on a frequency band selected by matching a vibration frequency of a vibration sensor signal to an engine frequency transformed under the engine running condition; and
   when the fuel injection timing matches with the engine running condition, updating, by the controller, a fuel injection parameter by correcting a target value of a combustion factor based on the fuel injection timing.

2. The engine combustion control method of claim 1, wherein the engine running condition includes revolutions per minute (RPM) of the engine and an engine load, and the engine RPM is transformed into the engine frequency.

3. The engine combustion control method of claim 1, wherein the combustion factor includes at least one of a Location of Peak Pressure, a Location of Maximum Heat Release Ratio, or a Start of Combustion generated in the engine.

4. The engine combustion control method of claim 1, wherein the fuel injection parameter is a main injection timing and a pilot injection timing of the engine.

5. The engine combustion control method of claim 1, wherein the variable control is classified into a sampling frequency downsizing analysis control that calculates a Wavelet maximum value with the engine frequency, the vibration frequency, the frequency band, and the Wavelet process, and a combustion factor correction control that corrects a combustion factor target value for updating a fuel injection parameter by using the Wavelet maximum value.

6. The engine combustion control method of claim 5, wherein the sampling frequency downsizing analysis control is performed by calculating a frequency$_1$ having a tendency of transforming revolutions per minute (RPM) of the engine into the engine frequency to increase in an engine RPM rising section, dividing the sampling frequency with a plurality of vibration signal scale factors of the frequency band selected by matching the frequency$_1$ to the frequency of the vibration sensor signal, generating a plurality of Wavelet transform values as a result of the Wavelet process for each vibration signal scale factor of the plurality of vibration signal scale factors, and calculating the Wavelet maximum value by summing the plurality of Wavelet transform values into one.

7. The engine combustion control method of claim 6, wherein calculating the frequency$_1$ includes: applying a frequency transform factor and a frequency correction value to the RPM of the engine, and making a pair with a frequency$_2$ having a tendency of increasing in the engine RPM rising section.

8. The engine combustion control method of claim 6, wherein the Wavelet transform value is calculated by applying a Mother wavelet function of Meyer.

9. The engine combustion control method of claim 6, wherein the Wavelet maximum value is calculated by performing a smoothing processing by applying a Coefficient to a cubic spline as 0.7.

10. The engine combustion control method of claim 9, wherein the Wavelet maximum value is applied to calculate, as combustion factors, a Location of Peak Pressure, a Location of Maximum Heat Release Ratio, and a Start of Combustion.

11. The engine combustion control method of claim 5, wherein the combustion factor correction control includes:
performing an injection timing target value correction control that applies a combustion factor target value correction calculated based on target combustion factor correction values of a Location of Peak Pressure or a Location of Maximum Heat Release Ratio comprised in the combustion factor, and
performing a Start of Combustion target value correction control that applies the combustion factor target value correction calculated based on a target Start of Combustion correction value of a Start of Combustion comprised in the combustion factor.

12. The engine combustion control method of claim 11, wherein the injection timing target value correction control is performed by calculating a correction Location of Peak Pressure calculation value by reading a Location of Peak Pressure offset of the Location of Peak Pressure or a correction Location of Maximum Heat Release Ratio calculation value by reading the Location of Maximum Heat Release Ratio offset of the Location of Maximum Heat Release Ratio, and calculating a target Location of Peak Pressure correction value by reading a Location of Peak Pressure target value of the Location of Peak Pressure or a target Location of Maximum Heat Release Ratio correction value by reading a Location of Maximum Heat Release Ratio target value of the Location of Maximum Heat Release Ratio.

13. The engine combustion control method of claim 12, wherein the correction Location of Peak Pressure calculation value is calculated by summing the Wavelet maximum value and the Location of Peak Pressure offset and the correction Location of Maximum Heat Release Ratio calculation value is calculated by summing the Wavelet maximum value and the Location of Maximum Heat Release Ratio offset.

14. The engine combustion control method of claim 12, wherein the target Location of Peak Pressure correction value is calculated based on a difference between the Location of Peak Pressure target value and the correction Location of Peak Pressure calculation value, and the target Location of Maximum Heat Release Ratio correction value is calculated based on a difference between the Location of Maximum Heat Release Ratio target value and the correction Location of Maximum Heat Release Ratio calculation value.

15. The engine combustion control method of claim 11, wherein the Start of Combustion target value correction control is performed by calculating a correction Start of Combustion calculation value by reading a Start of Combustion offset of the Start of Combustion, and calculating a target Start of Combustion correction value by reading a Start of Combustion target value of the Start of Combustion.

16. The engine combustion control method of claim 15, wherein the correction Start of Combustion calculation value is calculated by summing the Wavelet maximum value and the Start of Combustion offset.

17. The engine combustion control method of claim 15, wherein the target Start of Combustion correction value is calculated based on a difference between the Start of Combustion target value and the correction Start of Combustion calculation value.

18. The engine combustion control method of claim 1, wherein the updated value of the fuel injection parameter is output from the controller to a proportional Integral (PI) controller, and the PI controller is configured to perform an adjustment of the fuel injection timing with a main injection timing and a pilot injection timing of the engine by using a Proportional control value and an Integral control value.

19. An engine combustion control system, comprising:
a controller configured to:
- perform a Wavelet process on a frequency band corresponding to an engine vibration frequency matched to an engine frequency obtained by transforming revolutions per minute (RPM) of an engine at which an engine running condition of the engine is matched with a fuel injection timing of the engine, and
- update a fuel injection parameter by correcting target values of a Location of Peak Pressure, a Location of Maximum Heat Release Ratio, and a Start of Combustion, which are combustion factors, with a Wavelet maximum value calculated through the Wavelet process; and a vibration sensor mounted to a block of the engine and configured to detect the engine vibration frequency.

20. The engine combustion control system of claim 19, wherein the controller is configured to output the updated value of the fuel injection parameter to a Proportional Integral (PI) controller, and the PI controller is configured to control a main injection timing and a pilot injection timing of an engine combustion by using a Proportional control value and an Integral control value.

\* \* \* \* \*